US012756211B2

(12) United States Patent
Zhao et al.

(10) Patent No.: US 12,756,211 B2
(45) Date of Patent: Oct. 6, 2026

(54) CHARGING SYSTEM, CHARGING METHOD, AND VEHICLE

(71) Applicant: Shinry Technologies Co., Ltd., Shenzhen (CN)

(72) Inventors: Deqi Zhao, Shenzhen (CN); Renhua Wu, Shenzhen (CN)

(73) Assignee: Shinry Technologies Co., Ltd., Shenzhen (CN)

(*) Notice: Subject to any disclaimer, the term of this patent is extended or adjusted under 35 U.S.C. 154(b) by 757 days.

(21) Appl. No.: 18/327,111

(22) Filed: Jun. 1, 2023

(65) Prior Publication Data

US 2023/0307928 A1 Sep. 28, 2023

Related U.S. Application Data

(63) Continuation of application No. PCT/CN2020/138586, filed on Dec. 23, 2020.

(51) Int. Cl.
*H02J 7/60* (2026.01)
*B60L 53/122* (2019.01)
(Continued)

(52) U.S. Cl.
CPC .............. *H02J 7/60* (2026.01); *B60L 53/122* (2019.02); *B60L 53/60* (2019.02);
(Continued)

(58) Field of Classification Search
CPC ...... H02J 7/60; H02J 2207/20; H02J 2105/37; H02J 7/865; H02J 7/02; H02J 7/00;
(Continued)

(56) References Cited

U.S. PATENT DOCUMENTS 4,779,035 A * 10/1988 Engelmann ............... H02J 7/96
320/139
5,633,577 A * 5/1997 Matsumae .............. B60L 53/22
320/138
(Continued)

FOREIGN PATENT DOCUMENTS

CN 102299631 A 12/2011
CN 205666757 U * 10/2016 ................ H02J 7/00
(Continued)

OTHER PUBLICATIONS

CN110774909A to Zhang Machine Transaltion, (Year: 2020).*
(Continued)

*Primary Examiner* — M Baye Diao
(74) *Attorney, Agent, or Firm* — IP Spring

(57) ABSTRACT

A charging system, a charging method, and a vehicle are provided. The charging system includes a primary-side bridge circuit, a transformer, a first secondary-side bridge circuit, and a second secondary-side bridge circuit. The primary-side bridge circuit is connected with a primary winding of the transformer. The first secondary-side bridge circuit and the second secondary-side bridge circuit are connected with a secondary winding of the transformer respectively. On condition that power is transferred from the first secondary-side bridge circuit to the second secondary-side bridge circuit, switching transistors of the first secondary-side bridge circuit are turned on once switching transistors of the primary-side bridge circuit are on for a duration Td.

18 Claims, 5 Drawing Sheets

(51) Int. Cl.
*B60L 53/60* (2019.01)
*H02M 3/335* (2006.01)

(52) U.S. Cl.
CPC ... *H02M 3/33571* (2021.05); *H02M 3/33584* (2013.01); *B60L 2210/10* (2013.01); *H02J 2207/20* (2020.01)

(58) Field of Classification Search
CPC .... B60L 53/122; B60L 53/60; B60L 2210/10; B60L 53/00; H02M 3/33571; H02M 3/33584; H02M 1/007; H02M 3/158; H02M 3/33573; H02M 3/33561; H02M 3/01; Y02T 10/70; Y02T 10/7072; Y02T 10/92
USPC .......................................................... 320/109
See application file for complete search history.

(56) References Cited

U.S. PATENT DOCUMENTS

| | | | | | |
|---|---|---|---|---|---|
| 5,808,879 | A * | 9/1998 | Liu | H02M 3/01 363/56.05 |
| 6,906,931 | B1 * | 6/2005 | Batarseh | H02M 3/33569 363/17 |
| 9,431,917 | B2 * | 8/2016 | Okamoto | H02M 1/12 |
| 10,574,148 | B1 * | 2/2020 | Jitaru | H02M 1/0058 |
| 10,696,182 | B2 * | 6/2020 | Khaligh | H01F 27/38 |
| 2018/0222333 | A1 * | 8/2018 | Khaligh | H02M 1/4258 |
| 2020/0212817 | A1 * | 7/2020 | Sun | B60L 50/64 |

FOREIGN PATENT DOCUMENTS

| | | | | | |
|---|---|---|---|---|---|
| CN | 103959623 | B * | 11/2016 | | |
| CN | 106936184 | A | 7/2017 | | |
| CN | 107623365 | A | 1/2018 | | |
| CN | 207156960 | U | 3/2018 | | |
| CN | 110014986 | A | 7/2019 | | |
| CN | 110040028 | A | 7/2019 | | |
| CN | 110198862 | A | 9/2019 | | |
| CN | 110289667 | A | 9/2019 | | |
| CN | 209389954 | U | 9/2019 | | |
| CN | 110774909 | A * | 2/2020 | | B60L 53/31 |
| CN | 111251916 | A | 6/2020 | | |
| CN | 111316545 | A | 6/2020 | | |
| CN | 210669899 | U | 6/2020 | | |
| CN | 111404387 | A * | 7/2020 | | B60L 53/22 |
| CN | 210970721 | U | 7/2020 | | |
| CN | 111555638 | A | 8/2020 | | |
| EP | 0851566 | B1 | 3/2003 | | |
| JP | 6024209 | B2 * | 11/2016 | | B60L 55/00 |
| KR | 20200061672 | A | 6/2020 | | |

OTHER PUBLICATIONS

C. Liu et al., "High-Efficiency Hybrid Full-Bridge-Half-Bridge Converter With Shared ZVS Lagging Leg and Dual Outputs in Series," in IEEE Transactions on Power Electronics, vol. 28, No. 2, pp. 849-861, Feb. 2013 (Year: 2013).*

B. Gu, J.-S. Lai, N. Kees and C. Zheng, "Hybrid-Switching Full-Bridge DC-DC Converter With Minimal Voltage Stress of Bridge Rectifier, Reduced Circulating Losses, and Filter Requirement for Electric Vehicle Battery Chargers," in IEEE Transactions on Power Electronics, vol. 28, No. 3, pp. 1132-1144 (Year: 2013).*

CNIPA, International Search Report for International Patent Application No. PCT/CN2020/138586, Jul. 2, 2021, 8 pages.

CNIPA, First Office Action for Chinese Patent Application No. 202080008185.4, Apr. 20, 2022, 14 pages.

CNIPA, Written Opinion for International Patent Application No. PCT/CN2020/138586, Jul. 2, 2021, 5 pages.

EPO, Extended European Search Report for corresponding European Patent Application No. 20966372.3, Dec. 18, 2023, 7 pages.

* cited by examiner

CHARGING SYSTEM, CHARGING METHOD, AND VEHICLE

CROSS-REFERENCE TO RELATED APPLICATIONS

This application is a continuation under 35 U.S.C. § 120 of International Application No. PCT/CN2020/138586, filed Dec. 23, 2020, the entire disclosure of which is hereby incorporated by reference.

TECHNICAL FIELD

This disclosure relates to the field of electrical technology, and in particular to a charging system, a charging method, and a vehicle.

BACKGROUND

New energy vehicles are mainly driven by power batteries. To keep an endurance mileage capability, a power battery needs to be charged periodically through a charging system.

At present, some of charging systems have bidirectional charging functions. The charging system includes a primary-side circuit and two secondary-side circuits. The charging system with a bidirectional charging function has multiple operating modes, one of which is a direct current to direct current (DC-DC) mode, in which power of a direct current (DC) power supply connected with one secondary-side circuit is transferred from this secondary-side circuit to the other secondary-side circuit, and is finally supplied to a DC operating device connected with the other secondary-side circuit. In the DC-DC mode, closed-loop control only relates to the two secondary-side circuits, and the primary-side circuit is unloaded and is not involved in closed-loop control. In addition, power supplied by one secondary-side circuit is also transferred to the primary-side circuit through a transformer. As a result, since the closed-loop control does not relate to the primary-side circuit, components such as switching transistors of the primary-side circuit and capacitors of the primary-side circuit may be damaged by the power transferred or high voltage transferred in secondary.

SUMMARY

In a first aspect, a charging system is provided in the present disclosure. The charging system includes a primary-side bridge circuit, a transformer, a first secondary-side bridge circuit, and a second secondary-side bridge circuit. The primary-side bridge circuit is connected with a primary winding of the transformer. The first secondary-side bridge circuit and the second secondary-side bridge circuit are connected with a secondary winding of the transformer respectively. On condition that power is transferred from the first secondary-side bridge circuit to the second secondary-side bridge circuit, switching transistors of the first secondary-side bridge circuit are turned on once switching transistors of the primary-side bridge circuit are on for a duration Td.

In a second aspect, a charging method is provided in the present disclosure. The method is applied to a charging system. The charging system includes a primary-side bridge circuit, a transformer, a first secondary-side bridge circuit, and a second secondary-side bridge circuit. The primary-side bridge circuit is connected with a primary winding of the transformer. The first secondary-side bridge circuit and the second secondary-side bridge circuit are connected with a secondary winding of the transformer respectively. The method includes the following. Switching transistors of the first secondary-side bridge circuit are turned on once switching transistors of the primary-side bridge circuit are on for a duration Td, on condition that power is transferred from the first secondary-side bridge circuit to the second secondary-side bridge circuit.

In a third aspect, a vehicle is provided in the present disclosure. The vehicle includes a charging system. The charging system includes a primary-side bridge circuit, a transformer, a first secondary-side bridge circuit, and a second secondary-side bridge circuit. The primary-side bridge circuit is connected with a primary winding of the transformer. The first secondary-side bridge circuit and the second secondary-side bridge circuit are connected with a secondary winding of the transformer respectively. On condition that power is transferred from the first secondary-side bridge circuit to the second secondary-side bridge circuit, switching transistors of the first secondary-side bridge circuit are turned on once switching transistors of the primary-side bridge circuit are on for a duration Td.

BRIEF DESCRIPTION OF THE DRAWINGS

In order to explain technical solutions in implementations of the present disclosure more clearly, the following will give a brief introduction to the accompanying drawings required for describing the implementations.

REFERENCE SIGNS

Figure 1:
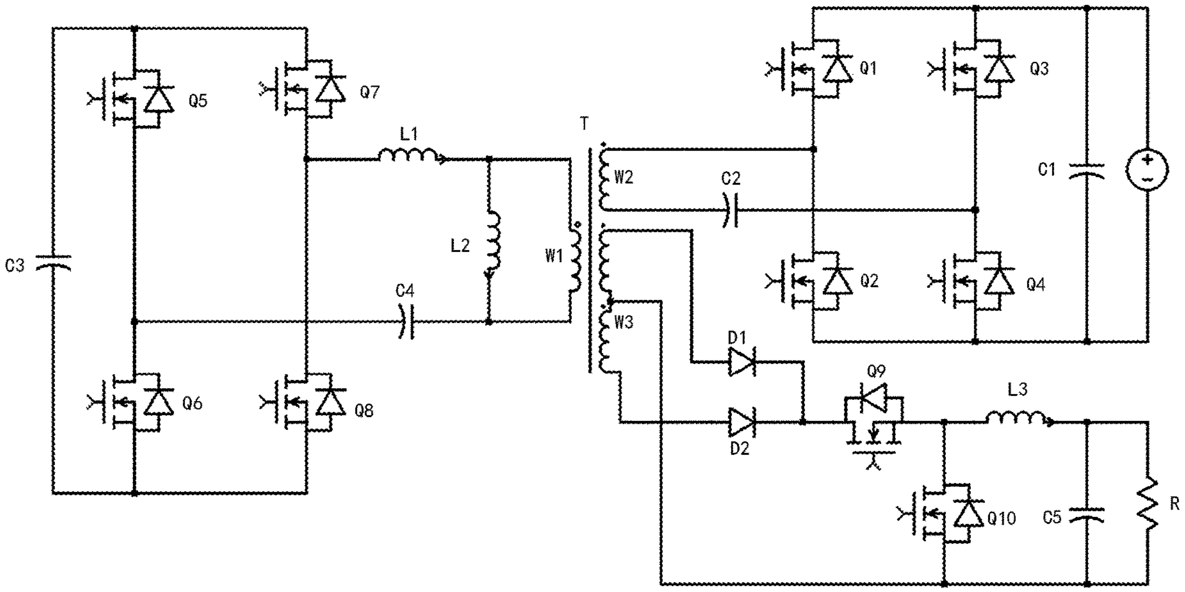
FIG. 1 is a circuit diagram of a charging system provided in implementations of the present disclosure.

Q1—first switching transistor, Q2—second switching transistor, Q3—third switching transistor, Q4—fourth switching transistor, Q5—fifth switching transistor, Q6—sixth switching transistor, Q7—seventh switching transistor, Q8—eighth switching transistor, Q9—ninth switching transistor, Q10—tenth switching transistor, C1—first capacitor, C2—second capacitor, C3—third capacitor, C4—fourth capacitor, C5—fifth capacitor, L1—first inductor, L2—second inductor, L3—third inductor, D1—first diode, D2—second diode, R—resistor.

DETAILED DESCRIPTION

Technical solutions in implementations of the present disclosure will be described clearly and completely with reference to accompanying drawings in implementations of the present disclosure.

The present disclosure aims to provide a charging system and a vehicle, and solve a problem that components such as a switching transistor, a high-voltage electrolytic capacitor, etc., of a primary-side circuit are damaged.

In a first aspect, a charging system is provided in the present disclosure. The charging system includes a primary-side bridge circuit, a transformer, a first secondary-side bridge circuit, and a second secondary-side bridge circuit. The primary-side bridge circuit is connected with a primary winding of the transformer. The first secondary-side bridge circuit and the second secondary-side bridge circuit are connected with a secondary winding of the transformer respectively. On condition that power is transferred from the first secondary-side bridge circuit to the second secondary-side bridge circuit, switching transistors of the first secondary-side bridge circuit are turned on once switching transistors of the primary-side bridge circuit are on for a duration Td.

In some implementations, the primary-side bridge circuit is controlled by symmetrical pulse width modulation (PWM), and the first secondary-side bridge circuit is controlled by asymmetrical PWM.

In some implementations, the first secondary-side bridge circuit includes a first half-bridge circuit and a second half-bridge circuit connected in parallel. The first half-bridge circuit includes a first switching transistor and a second switching transistor. The second half-bridge circuit includes a third switching transistor and a fourth switching transistor. The first switching transistor and the fourth switching transistor are arranged diagonally. The second switching transistor and the third switching transistor are arranged diagonally. The first secondary-side bridge circuit being controlled by the asymmetrical PWM includes the following. The first switching transistor and the fourth switching transistor are turned on simultaneously on condition that the first switching transistor and the fourth switching transistor form a loop. An on duration T1 of the first switching transistor is longer than an on duration T2 of the fourth switching transistor. The second switching transistor and the third switching transistor are turned on simultaneously on the condition that the second switching transistor and the third switching transistor form a loop. An on duration T1 of the third switching transistor is longer than an on duration T2 of the second switching transistor.

In some implementations, the first secondary-side bridge circuit being controlled by the asymmetric PWM further includes the following. The second switching transistor and the third switching transistor are turned off on condition that the fourth switching transistor is off for a duration T12 and the first switching transistor is on for the duration T12. The first switching transistor and the fourth switching transistor are turned off on condition that the second switching transistor is off for the duration T12 and the third switching transistor is on for the duration T12. The on duration T1, the on duration T2, and the duration T12 satisfy: T12=T1−T2.

In some implementations, the first secondary-side bridge circuit being controlled by the asymmetric PWM further includes the following. The second switching transistor and the third switching transistor are turned on simultaneously once the first switching transistor is off for a duration TD. Once the third switching transistor is off for the duration TD, a next operating period proceeds.

In some implementations, the on duration T2 of the second switching transistor and the on duration T2 of the fourth switching transistor are adjustable. On condition that the on duration T2 is prolonged, a range of an output voltage of the first secondary-side bridge circuit is expanded.

In some implementations, an on duration Td of the switching transistors of the primary-side bridge circuit has a range satisfying: 300 nanoseconds (ns)≥Td≥500 ns.

In some implementations, the primary-side bridge circuit includes a third half-bridge circuit and a fourth half-bridge circuit connected in parallel. The third half-bridge circuit includes a fifth switching transistor and a sixth switching transistor. The fourth half-bridge circuit includes a seventh switching transistor and an eighth switching transistor. The fifth switching transistor and the eighth switching transistor are arranged diagonally. The sixth switching transistor and the seventh switching transistor are arranged diagonally. The primary-side bridge circuit being controlled by the symmetrical PWM includes the following. An on duration T4 of the fifth switching transistor is equal to an on duration T4 of the eighth switching transistor, on condition that the fifth switching transistor and the eighth switching transistor form a loop. An on duration T3 of the seventh switching transistor is equal to an on duration T3 of the sixth switching transistor, on condition that the sixth switching transistor and the seventh switching transistor form a loop.

In some implementations, in an operating period TS, the sixth switching transistor and the seventh switching transistor are turned off, once the sixth switching transistor and the seventh switching transistor are on synchronously for a duration T3. The fifth switching transistor and the eighth switching transistor are turned off, once the fifth switching transistor and the eighth switching transistor are on synchronously for a duration T4 after the sixth switching transistor and the seventh switching transistor are off for a duration T0. A next operating period TS proceeds, once the fifth switching transistor and the eighth switching transistor are off for the duration T0.

In a second aspect, a charging method is provided in the present disclosure. The method is applied to a charging system. The charging system includes a primary-side bridge circuit, a transformer, a first secondary-side bridge circuit, and a second secondary-side bridge circuit. The primary-side bridge circuit is connected with a primary winding of the transformer. The first secondary-side bridge circuit and the second secondary-side bridge circuit are connected with a secondary winding of the transformer respectively. The method includes the following. Switching transistors of the first secondary-side bridge circuit are turned on once switching transistors of the primary-side bridge circuit are on for a duration Td, on condition that power is transferred from the first secondary-side bridge circuit to the second secondary-side bridge circuit.

In some implementations, the primary-side bridge circuit is controlled by symmetrical PWM, and the first secondary-side bridge circuit is controlled by asymmetrical PWM.

In some implementations, the first secondary-side bridge circuit includes a first half-bridge circuit and a second half-bridge circuit connected in parallel. The first half-bridge circuit includes a first switching transistor and a second switching transistor. The second half-bridge circuit includes a third switching transistor and a fourth switching transistor. The first switching transistor and the fourth switching transistor are arranged diagonally. The second switching transistor and the third switching transistor are arranged diagonally. The first secondary-side bridge circuit is controlled by the asymmetrical PWM as follows. The first switching transistor and the fourth switching transistor are turned on simultaneously on condition that the first switching transistor and the fourth switching transistor form a loop. An on duration T1 of the first switching transistor is longer than an on duration T2 of the fourth switching transistor. The second switching transistor and the third switching transistor are turned on simultaneously on the condition that the second switching transistor and the third switching transistor form a loop. An on duration T1 of the third switching transistor is longer than an on duration T2 of the second switching transistor.

In some implementations, the first secondary-side bridge circuit is further controlled by the asymmetric PWM as follows. The second switching transistor and the third switching transistor are turned off on condition that the fourth switching transistor is off for a duration T12 and the first switching transistor is on for the duration T12. The first switching transistor and the fourth switching transistor are turned off on condition that the second switching transistor is off for the duration T12 and the third switching transistor is on for the duration T12. The on duration T1, the on duration T2, and the duration T12 satisfy: $T12=T1-T2$.

In some implementations, the first secondary-side bridge circuit is further controlled by the asymmetric PWM as follows. The second switching transistor and the third switching transistor are turned on simultaneously once the first switching transistor is off for a duration TD. Once the third switching transistor is off for the duration TD, a next operating period proceeds.

In some implementations, the on duration T2 of the second switching transistor and the on duration T2 of the fourth switching transistor are adjustable. On condition that the on duration T2 is prolonged, a range of an output voltage of the first secondary-side bridge circuit is expanded.

In some implementations, an on duration Td of the switching transistors of the primary-side bridge circuit has a range satisfying: $300\ \text{ns} \geq Td \geq 500\ \text{ns}$.

In some implementations, the primary-side bridge circuit includes a third half-bridge circuit and a fourth half-bridge circuit connected in parallel. The third half-bridge circuit includes a fifth switching transistor and a sixth switching transistor. The fourth half-bridge circuit includes a seventh switching transistor and an eighth switching transistor. The fifth switching transistor and the eighth switching transistor are arranged diagonally. The sixth switching transistor and the seventh switching transistor are arranged diagonally. The primary-side bridge circuit is controlled by the symmetrical PWM as follows. An on duration T4 of the fifth switching transistor is equated with an on duration T4 of the eighth switching transistor, on condition that the fifth switching transistor and the eighth switching transistor form a loop. An on duration T3 of the seventh switching transistor is equated with an on duration T3 of the sixth switching transistor, on condition that the sixth switching transistor and the seventh switching transistor form a loop.

In some implementations, in an operating period TS, the primary-side bridge circuit is further controlled by the symmetrical PWM as follows. The sixth switching transistor and the seventh switching transistor are turned off, once the sixth switching transistor and the seventh switching transistor are on synchronously for a duration T3. The fifth switching transistor and the eighth switching transistor are turned off, once the fifth switching transistor and the eighth switching transistor are on synchronously for a duration T4 after the sixth switching transistor and the seventh switching transistor are off for a duration T0. A next operating period TS proceeds, once the fifth switching transistor and the eighth switching transistor are off for the duration T0.

In a third aspect, a vehicle is provided in the present disclosure. The vehicle includes the charging system in the first aspect of the present disclosure.

In some implementations, the primary-side bridge circuit is controlled by symmetrical PWM, and the first secondary-side bridge circuit is controlled by asymmetrical PWM.

In the present disclosure, the switching transistors of the primary-side circuit are turned on in advance of the switching transistors of one secondary-side circuit, such that in the DC-DC operating mode, the power transferred to the primary-side circuit is reduced, thereby avoiding damage to the switching transistors of the primary-side circuit, the high-voltage electrolytic capacitor, etc.

First, a circuit structure of a charging system provided in implementations of the present disclosure is introduced below. As illustrated in FIG. 1, a circuit of the charging system includes a primary-side bridge circuit, a transformer, a first secondary-side bridge circuit, and a second secondary-side bridge circuit.

The primary-side bridge circuit is connected with a primary winding W1 of the transformer. The first secondary-side bridge circuit and the second secondary-side bridge circuit are connected with a secondary winding of the transformer respectively. The secondary winding includes a first secondary winding W2 and a second secondary winding W3. The first secondary-side bridge circuit is connected with the first secondary winding W2. The second secondary-side bridge circuit is connected with the second secondary winding W3.

In detail, the first secondary-side bridge circuit includes a first half-bridge circuit and a second half-bridge circuit connected in parallel. The first half-bridge circuit includes a first switching transistor Q1 and a second switching transistor Q2. The second half-bridge circuit includes a third switching transistor Q3 and a fourth switching transistor Q4. The first switching transistor Q1 and the fourth switching transistor Q4 are arranged diagonally. The second switching transistor Q2 and the third switching transistor Q3 are arranged diagonally. The first secondary-side bridge circuit further includes a first capacitor C1 and a second capacitor C2. The first capacitor C1 is connected with the second half-bridge circuit in parallel. One end of the second capacitor C2 is connected with one end of the first secondary winding, and the other end of the second capacitor C2 is connected between the third switching transistor Q3 and the fourth switching transistor Q4. The other end of the first secondary winding is connected between the first switching transistor Q1 and the second switching transistor Q2.

The primary-side bridge circuit includes a third half-bridge circuit and a fourth half-bridge circuit connected in parallel. The third half-bridge circuit includes a fifth switching transistor Q5 and a sixth switching transistor Q6. The fourth half-bridge circuit includes a seventh switching transistor Q7 and an eighth switching transistor Q8. The fifth switching transistor Q5 and the eighth switching transistor Q8 are arranged diagonally. The sixth switching transistor Q6 and the seventh switching transistor Q7 are arranged diagonally. The primary-side bridge circuit further includes a third capacitor C3, a fourth capacitor C4, and a first inductor L1. The third capacitor C3 is connected with the third half-bridge circuit in parallel. One end of the first inductor L1 is connected between the seven switching transistor Q7 and the eight switching transistor Q8, and the other end of the first inductor L1 is connected with one end of the primary winding. One end of the fourth capacitor C4 is connected between the fifth switching transistor Q5 and the sixth switching transistor Q6, and the other end of the fourth capacitor C4 is connected with the other end of the primary winding.

The second secondary-side bridge circuit includes a ninth switching transistor Q9, a tenth switching transistor Q10, a first diode D1, a second diode D2, a third inductor L3, a fifth capacitor C5, and a resistor R. One end of the first diode D1 is connected with one end of the second secondary winding, and the other end of the first diode D1 is connected with one end of the ninth switching transistor Q9. One end of the second diode D2 is connected with the other end of the second secondary winding, and the other end of the second diode D2 is also connected with said one end of the ninth switching transistor Q9. The other end of the ninth switching transistor Q9 is connected with one end of the third inductor L3 and one end of the tenth switching transistor Q10 respectively. The other end of the third inductor L3 is connected with one end of the fifth capacitor C5 and one end of the resistor R respectively. The other end of the tenth switching transistor Q10, the other end of the fifth capacitor C5, and the other end of the resistor R are connected with the second secondary winding at the middle of the second secondary winding respectively.

In addition, the second inductor L2 illustrated in the figure is a leakage inductance of the transformer. The leakage inductance of the transformer has no physical entity in practice, and the second inductor L2 in the figure is only used for an illustrative purpose.

In general, a circuit of the charging system has five operating modes.

A first operating mode: power is inverted into an alternating current (AC) square wave at the primary-side bridge circuit, and then transferred to the first secondary-side bridge circuit through the transformer to charge a power battery of a vehicle.

A second operating mode: the power is inverted into the AC square wave at the primary-side bridge circuit, and then transferred to the first secondary-side bridge circuit through the transformer to charge the power battery of the vehicle. In the meanwhile, the power inverted is also transferred to the second secondary-side bridge circuit through the transformer, and then stabilized by a step-down circuit to charge a storage battery of the vehicle.

A third operating mode: a power is inverted into an AC square wave at the first secondary-side bridge circuit, and then transferred to the primary-side bridge circuit through the transformer to supply electrical energy of the power battery to an external load of an external vehicle.

A fourth operating mode: the power is inverted into the AC square wave at the first secondary-side bridge circuit, and then transferred to the primary-side bridge circuit through the transformer to supply the electrical energy of the power battery to the external load of the external vehicle. In the meanwhile, the power inverted is also transferred to the second secondary-side bridge circuit through the transformer, and then stabilized by the step-down circuit to charge the storage battery of the vehicle.

A fifth operating mode: the power is inverted into the AC square wave at the first secondary-side bridge circuit, then transferred to the second secondary-side bridge circuit through the transformer, and then stabilized by the step-down circuit to charge the storage battery of the vehicle.

The above fifth operating mode is also called a direct current to direct current (DC-DC) mode.

On condition that the circuit operates in the DC-DC mode, the power battery is connected across the first secondary-side bridge circuit as an input power supply, and switching transistors of the first secondary-side bridge circuit, which are arranged diagonally, are controlled to be turned on simultaneously, such that the first secondary-side bridge circuit can be controlled to output a square wave voltage. The square wave voltage will be transferred to the secondary winding of the transformer connected with the first secondary-side bridge circuit. According to an electromagnetic induction principle of the transformer, the transformer will output an proportional voltage at the primary winding connected with the primary-side bridge and an proportional voltage at the secondary winding connected with the second secondary-side bridge circuit, and output voltages at different windings are limited by a coil turn ratio between the windings of the transformer.

In other words, the square wave voltage output by the first secondary-side bridge circuit is not only transferred to the second secondary-side bridge circuit, but also transferred to the primary-side bridge circuit. The voltage transferred to the primary-side bridge circuit is rectified by a body diode of the primary-side bridge circuit and then filtered by the third capacitor C3, such that a stable high-voltage direct current (DC) is formed across the third capacitor C3 of the primary-side bridge circuit, and the high-voltage DC may damage the third capacitor C3. In the meanwhile, since the primary-side bridge circuit is further connected with a capacitor-inductor (i.e., LC) resonant circuit, on condition that the primary-side bridge circuit is completely unloaded, the voltage applied to the third capacitor C3 under the action of the resonant circuit will exceed the voltage at the primary winding of the transformer. Here, the voltage applied to the third capacitor C3 may damage circuit components connected with the primary-side bridge circuit. The third capacitor C3 may be a high-voltage aluminum electrolytic capacitor.

Figure 2:
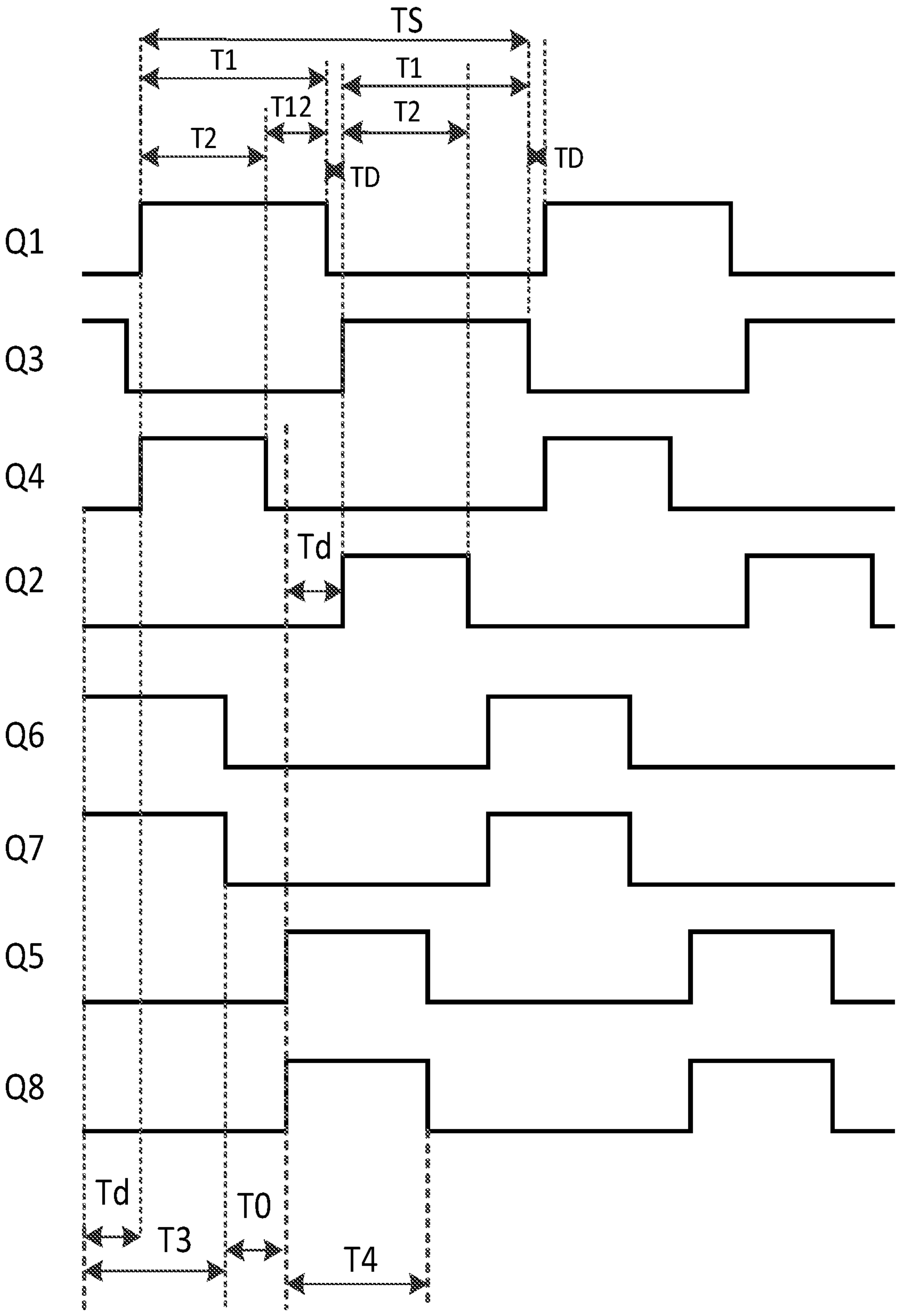
FIG. 2 is a sequence diagram of a charging system provided in implementations of the present disclosure.

Reference is made to FIG. 1 and FIG. 2 together. A charging system provided in the present disclosure aims to solve a problem that a voltage applied to the primary-side bridge circuit damages circuit components when the primary-side bridge circuit is unloaded.

Specifically, the charging system provided in the present disclosure includes a primary-side bridge circuit, a transformer, a first secondary-side bridge circuit, and a second secondary-side bridge circuit. The primary-side bridge circuit is connected with a primary winding of the transformer. The first secondary-side bridge circuit and the second secondary-side bridge circuit are connected with a secondary winding of the transformer respectively.

On condition that power is transferred from the first secondary-side bridge circuit to the second secondary-side bridge circuit, switching transistors of the first secondary-side bridge circuit are turned on once switching transistors of the primary-side bridge circuit are on for a duration Td. In the present disclosure, for example, the switching transistors may include, but are not limited to, an insulated gate bipolar transistor (IGBT), a metal-oxide-semiconductor field effect transistor (MOSFET), a gallium nitride (GaN) high electron mobility transistor (HEMT), etc.

Once the switching transistors of the primary-side bridge circuit are on for Td, the switching transistors of the first secondary-side bridge circuit are turned on. In other words, time at which the switching transistors of the primary-side bridge circuit are turned on is in advance of time at which the switching transistors of the first secondary-side bridge circuit is turned on, and an advanced on duration is equal to an on duration Td.

In a control mode that the switching transistors of the primary-side bridge circuit are turned on in advance, a relatively large current flows from the primary-side bridge circuit into the first secondary-side bridge circuit in the advanced on duration, and after the current flows into the first secondary-side bridge circuit, the switching transistors of the first secondary-side bridge circuit can realize a zero voltage switch (ZVS) operation by using the current.

It can be understood by those of ordinary skill in the art that the advanced on duration Td is adjustable, and when the advanced on duration Td is prolonged, the current flowing from the primary-side bridge circuit into the first secondary-side bridge circuit is larger. In this way, on condition that the circuit is in steady-state operation, the voltage applied to the third capacitor C3 of the primary-side bridge circuit will decrease, and the voltage applied to the components connected with the primary-side bridge circuit will decrease. Therefore, when the primary-side bridge circuit is unloaded, the damage to the third capacitor C3 and the components connected with the primary-side bridge circuit can be reduced.

In addition, in the advanced on duration of the switching transistors of the primary-side bridge circuit, the current flowing from the primary-side bridge circuit into the first secondary-side bridge circuit can also assist the switching transistors of the first secondary-side bridge circuit to realize zero-voltage on, and supply power to a load of the first secondary-side bridge circuit.

Once the switching transistors of the primary-side bridge circuit are on for the duration Td, the switching transistors of the first secondary-side bridge circuit are turned on. Here, when the switching transistors of the primary-side bridge circuit and the switching transistors of the first secondary-side bridge circuit each are on, the circuit is in a stable operating state.

Furthermore, reference can continue to be made to FIG. 2. The primary-side bridge circuit is controlled by symmetric pulse width modulation (PWM), and the first secondary-side bridge circuit is controlled by asymmetric PWM. The switching transistors of the first secondary-side bridge circuit are controlled by the asymmetric PWM, and the switching transistors of the primary bridge circuit are turned on in advance, such that ZVS of the switching transistors of the first secondary-side bridge circuit in a full load range can be realized, and an operating range of the ZVS is expanded.

Specifically, the first secondary-side bridge circuit includes a first half-bridge circuit and a second half-bridge circuit connected in parallel. The first half-bridge circuit includes a first switching transistor Q1 and a second switching transistor Q2. The second half-bridge circuit includes a third switching transistor Q3 and a fourth switching transistor Q4. The first switching transistor Q1 and the fourth switching transistor Q4 are arranged diagonally. The second switching transistor Q2 and the third switching transistor Q3 are arranged diagonally.

Reference can continue to be made to FIG. 2. The first secondary-side bridge circuit being controlled by the asymmetric PWM includes the following.

The first switching transistor Q1 and the fourth switching transistor Q4 are turned on simultaneously on condition that the first switching transistor Q1 and the fourth switching transistor Q4 form a loop. An on duration T1 of the first switching transistor Q1 is longer than an on duration T2 of the fourth switching transistor Q4. The second switching transistor Q2 and the third switching transistor Q3 are turned on simultaneously on the condition that the second switching transistor Q2 and the third switching transistor Q3 form a loop. An on duration T1 of the third switching transistor Q3 is longer than an on duration T2 of the second switching transistor Q2.

By adopting the asymmetric PWM, as the name implies, that is, on durations of two switching transistors arranged diagonally are different, so a width of an output voltage of the first secondary-side bridge circuit becomes controllable. Specifically, since the two switching transistors arranged diagonally are turned on simultaneously, the first secondary-side bridge circuit forms a loop, such that a voltage is output. Therefore, the on durations of the two switching transistors arranged diagonally are different, so a duration for the first secondary-side bridge circuit to form the loop is determined by a switching transistor with a shorter on duration in the two switching transistors arranged diagonally. Specifically, the duration for the first secondary-side bridge circuit to form the loop is the same as the on duration T2 of the second switching transistor Q2 and the on duration T2 of the fourth switching transistor Q4. The output voltage of the first secondary-side bridge circuit is determined by the duration for the secondary-side bridge circuit to form the loop, and an on duration of a switching transistor is determined by a duty cycle. Therefore, as long as a duty cycle of the second switching transistor Q2 and a duty cycle of the fourth switching transistor Q4 are determined, the output voltage of the first secondary-side bridge circuit can be determined, such that the output voltage of the first secondary-side bridge circuit is controllable.

It can be seen from the above that in implementations, the first secondary-side bridge circuit is controlled by the asymmetric PWM, such that output voltage stabilization of the first secondary-side bridge circuit in the DC-DC mode is realized. In the meanwhile, by the asymmetric PWM, that is, the first switching transistor Q1 and the fourth switching transistor Q4 are turned on with a time difference, and the second switching transistor Q2 and the third switching transistor Q3 are turned on with a time difference, such that the first switching transistor Q1 to the fourth switching transistor Q4 are off simultaneously after the duration T12, and the ZVS of the first switching transistor Q1 to the fourth switching transistor Q4 is realized.

Further, the on duration T2 of the second switching transistor Q2 and the on duration T2 of the fourth switching transistor Q4 are adjustable, and a range of the output voltage of the first secondary-side bridge circuit is expanded on condition that the on duration T2 is prolonged. Since the on duration of the switching transistor is determined by the duty cycle, the on duration T2 is adjustable, that is, the duty cycle of the second switching transistor Q2 and the duty cycle of the fourth switching transistor Q4 are adjustable. By adjusting the duty cycle of the second switching transistor Q2 and the duty cycle of the fourth switching transistor Q4, the output voltage of the first secondary-side bridge circuit can be adjusted. After adjusting the duty cycle, when the on duration T2 is longer, the output voltage is higher, and when the on duration T2 is shorter, the output voltage is lower. Therefore, the output voltage stabilization of the first secondary-side bridge circuit can be better realized in the DC-DC mode. In other words, a duty cycle of the output voltage of the first secondary-side bridge circuit can be more accurately controlled, the output voltage of the first secondary-side bridge circuit is applied to the second secondary-side bridge circuit through the transformer, and the DC voltage output of the second secondary-side bridge circuit can be stabilized after the voltage is rectified and filtered, so as to charge a low-voltage storage battery of the electric vehicle and meet driving needs.

Further, on condition that the first switching transistor Q1 and the fourth switching transistor Q4 form the loop, the first switching transistor Q1 and the fourth switching transistor Q4 are turned on simultaneously, the first switching transistor Q1 is on for the duration T1 and then turned off, and the fourth switching transistor Q4 is on for the duration T2 and then turned off. After the fourth switching transistor Q4 is turned off, the first switching transistor Q1 will be still on for the duration T12, and the second switching transistor Q2 and the third switching transistor Q3 are still off. In other words, on condition that the fourth switching transistor Q4 is off for the duration T12 and the first switching transistor Q1 is on for the duration T12, the second switching transistor Q2 and the third switching transistor Q3 are off.

On condition that the second switching transistor Q2 and the third switching transistor Q3 form the loop, the second switching transistor Q2 and the third switching transistor Q3 are turned on simultaneously, the third switching transistor Q3 is on for the duration T1 and then turned off, and the second switching transistor Q2 is on for the duration T2 and then turned off. After the second switching transistor Q2 is turned off, the third switching transistor Q3 will be still on for the duration T12, and the first switching transistor Q1 and the fourth switching transistor Q4 are still off. In other words, on condition that the second switching transistor Q2 is off for the duration T12 and the third switching transistor Q3 is on for the duration T12, the first switching transistor Q1 and the fourth switching transistor Q4 is off. The duration T1, the duration T2 and the duration T12 satisfy: $T12=T1-T2$.

As mentioned above, the first switching transistor Q1 and the fourth switching transistor Q4 are turned on simultaneously, and the on duration T1 of the first switching transistor Q1 is longer than the on duration T2 of the fourth switching transistor Q4. Therefore, the fourth switching transistor Q4 is turned off in advance of the first switching transistor Q1, that is, the first switching transistor Q1 and the fourth switching transistor Q4 are turned off with a time difference, which is $T12=T1-T2$. On condition that the first switching transistor Q1 and the fourth switching transistor Q4 form the loop, in the time difference T12 of a first half period, the first switching transistor Q1 is still on, that is, after the fourth switching transistor Q4 is turned off, the first switching transistor Q1 will be still on for an on duration is T12. In a duration during which the fourth switching transistor Q4 is off and the first switching transistor Q1 is on, the second switching transistor Q2 and the third switching transistor Q3 are off. In other words, only the first switching transistor Q1 is on in this duration.

Once the fourth switching transistor Q4 is controlled to be turned off, a current in the first secondary-side bridge circuit will flow through a body diode of the third switching transistor Q3 and a body diode of the first switching transistor Q1, and then a new closed-loop current path will be formed. In this way, in an operating state where the body diode of the first switching transistor Q1 and the body diode of the third switching transistor Q3 are turned on to form a loop, a current flowing out of the transformer can only flow out in one direction, and a current in a parasitic inductor connected with the first secondary-side bridge circuit in series decreases. Since the third switching transistor Q3 is still off, the current in the parasitic inductor connected with the first secondary-side bridge circuit is unable to increase, so a circulating current in the transformer decreases.

Figure 3:
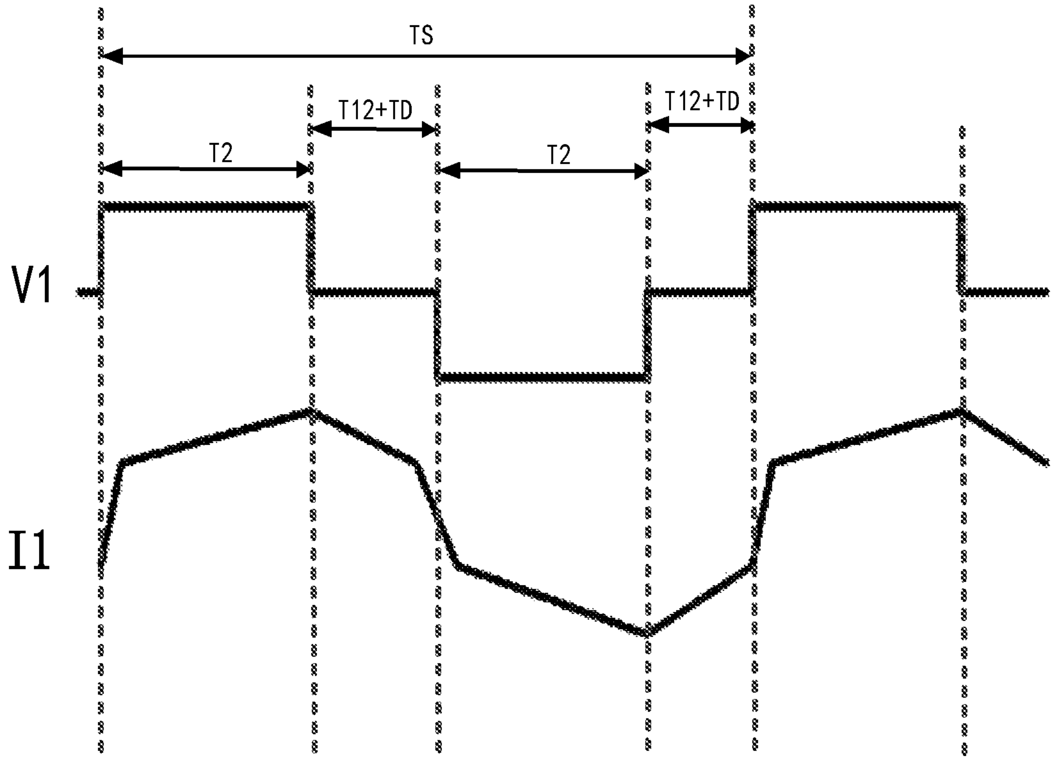
FIG. 3 is a sequence diagram of a current and a voltage of a first secondary-side bridge circuit provided in implementations of the present disclosure.

Reference is made to FIG. 3. It can be seen that once the fourth switching transistor Q4 is controlled to be turned off, the circulating current decreases, and the current transferred to the primary-side bridge circuit decreases, so the damage to the third capacitor C3 of the primary-side bridge circuit and the components connected with the primary-side bridge circuit is relatively less. When the circulating current decreases, a voltage of the switching transistor and a voltage of a high-voltage electrolytic capacitor of the primary-side bridge circuit decrease. In addition, the primary-side bridge circuit is turned on in advance of the first secondary-side bridge circuit by Td, and a current flows out from the third capacitor C3 in this advanced duration. In one operating period, electric charges in the third capacitor C3 of the primary-side bridge circuit flow out in the duration Td, so under a comprehensive action of reducing the circulating current and the primary-side bridge circuit being turned on in advance of the first secondary-side bridge circuit by Td, the voltage of the high-voltage electrolytic capacitor of the primary-side bridge circuit can be reduced.

Figure 4:
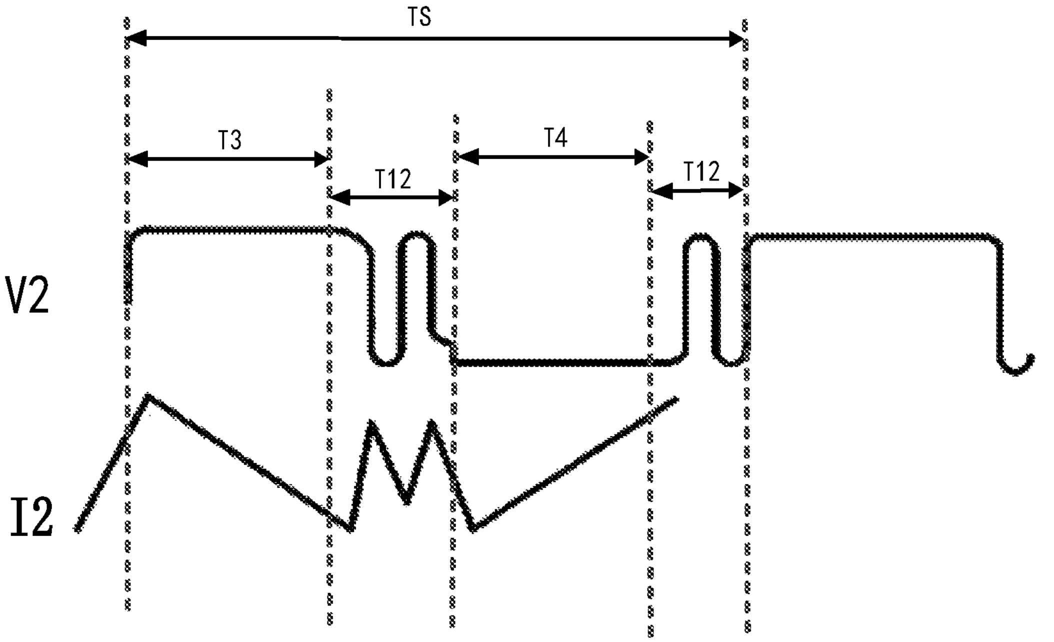
FIG. 4 is a sequence diagram of a current and a voltage of a primary-side bridge circuit provided in implementations of the present disclosure.
Figure 5:
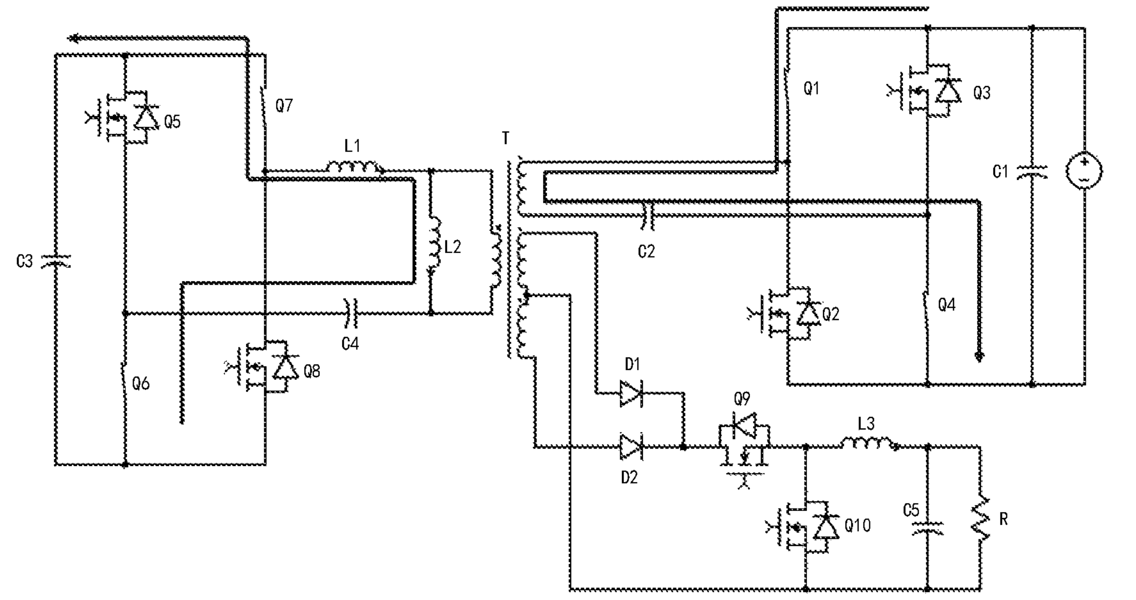
FIG. 5 is a schematic diagram illustrating a current flow direction of a charging system provided in implementations of the present disclosure.

Similarly, the second switching transistor Q2 and the third switching transistor Q3 are turned on simultaneously, and an on duration T1 of the third switching transistor Q3 is longer than an on duration T2 of the second switching transistor Q2. Therefore, the second switching transistor Q2 is turned off in advance of the third switching transistor Q3, that is, the second switching transistor Q2 and the third switching transistor Q3 are turned off with a time difference, which is also $T12=T1-T2$. In the time difference T12, the third switching transistor Q3 is still on, that is, after the second switching transistor Q2 is turned off, the third switching transistor Q3 keeps on for an on duration T12. In a duration during which the second switching transistor Q2 is off and the third switching transistor Q3 keeps on, the first switching transistor Q1 and the fourth switching transistor Q4 are off. In other words, only the third switching transistor Q3 is on at this time. In this way, in an operating state where the second switching transistor Q2 and the third switching transistor Q3 form the loop, the circulating current in the secondary winding of the transformer connected with the first secondary-side bridge circuit can also be reduced. When the circulating current is reduced, the current transferred to the primary-side bridge circuit will be reduced, and the voltage of the third capacitor C3 of the primary-side bridge circuit will be reduced, such that a probability that the components connected with the primary-side bridge circuit is damaged is reduced. Reference can be to FIG. 4. It can be seen that when the first switching transistor Q1 and the third switching transistor Q3 each are off, the voltage of the winding of the transformer corresponds to a free oscillation waveform as illustrated by T12 in FIG. 4.

Furthermore, the first secondary-side bridge circuit being controlled by the asymmetric PWM further includes the following. Once the first switching transistor Q1 is off for a duration TD, the second switching transistor Q2 and the third switching transistor Q3 are turned on simultaneously. Once the third switching transistor Q3 is off for the duration TD, a next operating period proceeds. The fourth switching transistor Q4 has been off before the first switching transistor Q1 is turned off, and the second switching transistor Q2 and the third switching transistor Q3 are also off in the duration TD during which the first switching transistor Q1 is off. In other words, in the duration TD, the first switching transistor Q1 to the fourth switching transistor Q4 each are off, that is, the first switching transistor Q1 to the fourth switching transistor Q4 each are in a zero voltage state. As mentioned above, the switching transistors of the primary-side bridge circuit are turned on in advance, such that in the advanced on duration Td, a relatively large current flows from the primary-side bridge circuit into the first secondary-side bridge circuit, and after the current flows into the first secondary-side bridge circuit, the switching transistors of the first secondary-side bridge circuit are turned on by using the current. In combination with a case where both the first switching transistor Q1 to the fourth switching transistor Q4 are in the zero voltage state, the first switching transistor Q1 to the fourth switching transistor Q4 can realize ZVS. Optionally, a value of TD may be 300 nanoseconds (ns).

Optionally, the on duration Td of the switching transistors of the primary-side bridge circuit are adjustable, and on condition that the duration Td increases, the voltage across the high-voltage electrolytic capacitor of the primary-side bridge circuit decreases. In an implementation, the on duration Td of the switching transistors of the primary-side bridge circuit is: 300 ns≥Td≥500 ns. Td is limited to 300 ns to 500 ns, such that the first switching transistor Q1 to the fourth switching transistor Q4 can realize a full-range ZVS. The full range here refers to a full output load range of the DC-DC operation mode, such as an operating range with an output current from 0% to 100%. In addition, adjustable Td can also realize a relatively good balance on the loss of the primary-side bridge circuit.

Further, the primary-side bridge circuit includes a third half-bridge circuit and a fourth half-bridge circuit connected in parallel. The third half-bridge circuit includes a fifth switching transistor Q5 and a sixth switching transistor Q6. The fourth half-bridge circuit includes a seventh switching transistor Q7 and an eighth switching transistor Q8. The fifth switching transistor Q5 and the eighth switching transistor Q8 are arranged diagonally. The sixth switching transistor Q6 and the seventh switching transistor Q7 are arranged diagonally.

The primary-side bridge circuit being controlled by the symmetric PWM includes the following. An on duration T4 of the fifth switching transistor Q5 is equal to an on duration T4 of the eighth switching transistor Q8, on condition that the fifth switching transistor Q5 and the eighth switching transistor Q8 form a loop. An on duration T3 of the seventh switching transistor Q7 is equal to the on duration T3 of the sixth switching transistor Q6, on condition that the sixth switching transistor Q6 and the seventh switching transistor Q7 form a loop.

Further, in an operating period TS, the sixth switching transistor Q6 and the seventh switching transistor Q7 are turned off, once the sixth switching transistor Q6 and the seventh switching transistor Q7 are on synchronously for a duration T3. The fifth switching transistor Q5 and the eighth switching transistor Q8 turned off, once the fifth switching transistor Q5 and the eighth switching transistor Q8 are on synchronously for a duration T4 after the sixth switching transistor Q6 and the seventh switching transistor Q7 are off for a duration TO. A next operating period TS proceeds, once the fifth switching transistor Q5 and the eighth switching transistor Q8 are off for the duration T0.

In combination with the above control method of the first secondary-side bridge circuit, it can be seen that an operating sequence of the first secondary-side bridge circuit may be as follows. In an operating period TS, the first switching transistor Q1 and the fourth switching transistor Q4 are turned on simultaneously, the first switching transistor Q1 is on for the duration T1 and then turned off, and the fourth switching transistor Q4 is on for the duration T2 and then turned off. Once the first switching transistor Q1 is off for the duration TD, the second switching transistor Q2 and the third switching transistor Q3 are turned on simultaneously, the second switching transistor Q2 is on for the duration T2 and then turned off, and the third switching transistor Q3 is on for the duration T1 and then turned off. Once the third switching transistor Q3 is off for the duration TD, the next operating period TS proceeds.

FIG. 5 to FIG. 8 illustrate schematic diagrams illustrating several current flow directions. A current flow direction illustrated in FIG. 5 corresponds to a current flow direction in FIG. 2 where the first switching transistor Q1, the fourth switching transistor Q4, the sixth switching transistor Q6, and the seventh switching transistor Q7 are on simultaneously, that is, the circuit is in steady-state operation. Here, the first secondary-side bridge circuit transfers power to the primary-side bridge circuit and the second secondary-side bridge circuit respectively.

Figure 6:
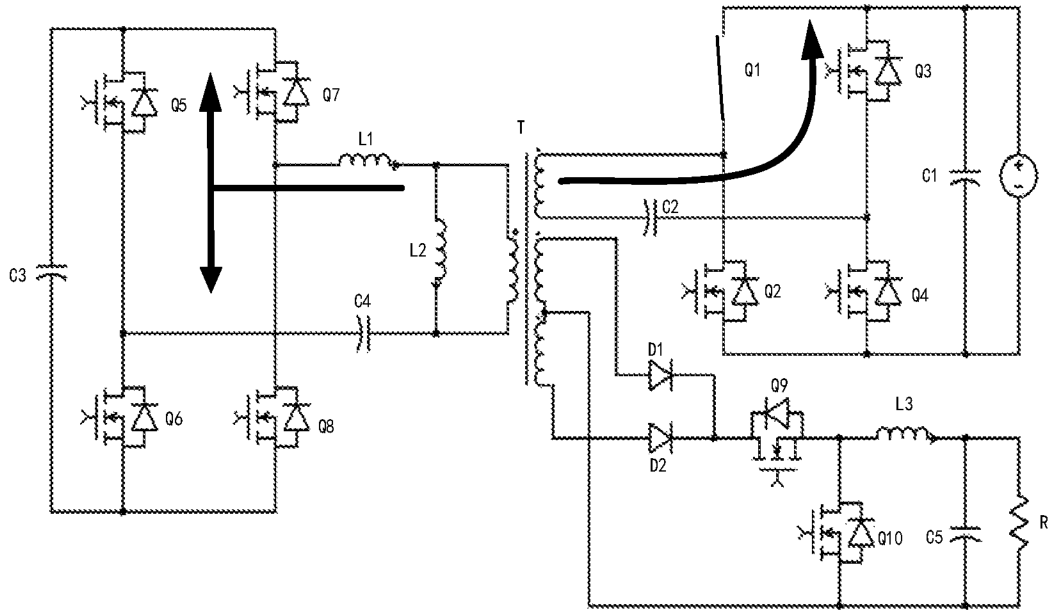
FIG. 6 is a schematic diagram illustrating a current flow direction of a charging system provided in implementations of the present disclosure.

A current flow direction illustrated in FIG. 6 corresponds to a current flow direction in the duration T12 of FIG. 2, where only the first switching transistor Q1 is on, and the second switching transistor Q2, the third switching transistor Q3, the fourth switching transistor Q4, and the fifth switching transistor Q5 to the eight switching transistor Q8 each are off. The current in the first secondary-side bridge circuit will flow through the second switching transistor Q2 and the third switching transistor Q3 to form a new closed-loop current path after the fourth switching transistor Q4 is turned off. The current has flown through the first inductor L1 of the primary-side bridge circuit in the previous state, so the current will charge a parasitic capacitor of the seventy switching transistor Q7 and a parasitic capacitor of the eighth switching transistor Q8. The current will also flow through a body diode of the sixth switching transistor Q6 and a body diode of the seventy switching transistor Q7 to form a new closed-loop current path, and resonate with parasitic capacitors of four switching transistors of the primary-side bridge circuit.

Figure 7:
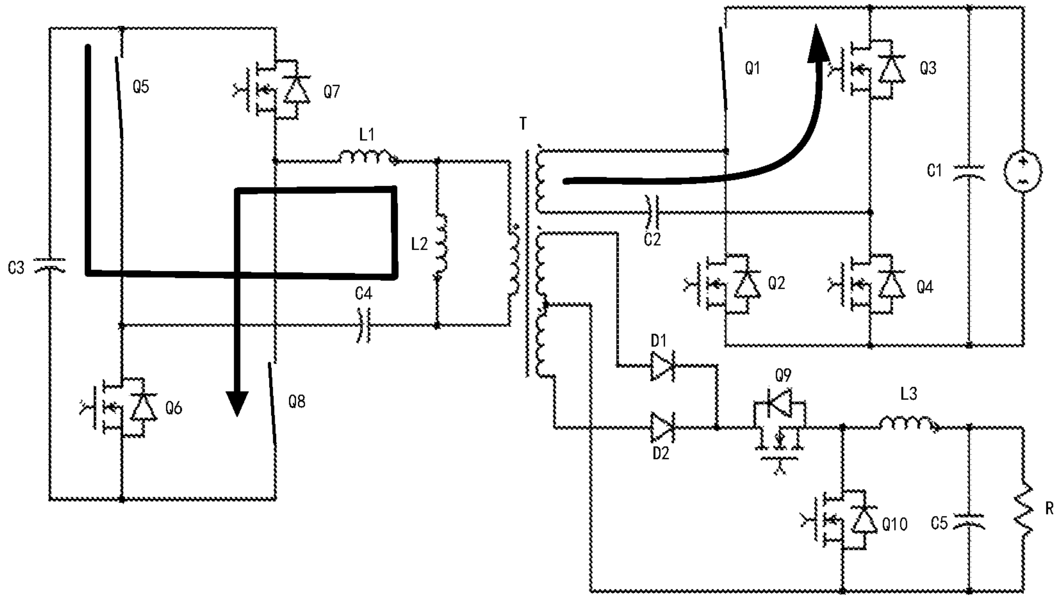
FIG. 7 is a schematic diagram illustrating a current flow direction of a charging system provided in implementations of the present disclosure.

A current flow direction illustrated in FIG. 7 corresponds to a current flow direction in a duration Td-TD in FIG. 2, where the first switching transistor Q5 and the eighth switching transistor Q8 of the primary-side bridge circuit are on, and the first switching transistor Q1 of the first secondary-side bridge circuit is on. The fifth switching transistor Q5 and the eighth switching transistor Q8 are on for the duration Td in advance, an in the duration Td, a relatively large current will flow into the third switching transistor Q3 and the fourth switching transistor Q4 of a bridge arm of the first secondary-side bridge circuit, such that a sufficient current is provided for realizing the ZVS of the first secondary-side bridge circuit.

Figure 8:
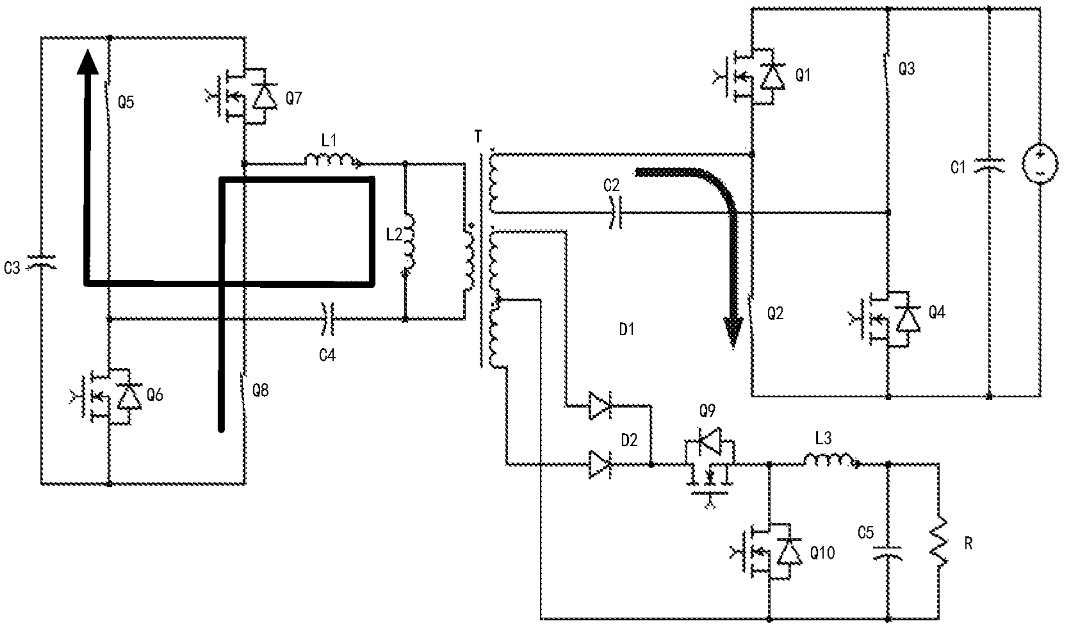
FIG. 8 is a schematic diagram illustrating a current flow direction of a charging system provided in implementations of the present disclosure.

A current flow direction illustrated in FIG. 8 corresponds to a current flow direction in FIG. 2, where the second switching transistor Q2, the third switching transistor Q3, the fifth switching transistor Q5, and the eighth switching transistor Q8 are on simultaneously, that is, the circuit is in steady-state operation. Here, the first secondary-side bridge circuit transfers the power to the primary-side bridge circuit and the second secondary-side bridge circuit respectively. Here, the primary-side bridge circuit performs commutation, and a negative current is commutated into a positive current.

The above implementations in the present disclosure are described in detail. Principles and implementation manners of the present disclosure are elaborated with specific implementations herein. The above illustration of implementations is only used to help to understand methods and core ideas of the present disclosure.

What is claimed is:

1. A charging system, comprising a primary-side bridge circuit, a transformer, a first secondary-side bridge circuit, and a second secondary-side bridge circuit, wherein:

the primary-side bridge circuit is connected with a primary winding of the transformer, the secondary winding of the transformer comprises a first secondary winding and a second secondary winding, the first secondary-side bridge circuit is connected with the first secondary winding, and the second secondary-side bridge circuit is connected with the second secondary winding; and on condition that power is transferred from the first secondary-side bridge circuit to the second secondary-side bridge circuit, switching transistors of the first secondary-side bridge circuit are turned on once switching transistors of the primary-side bridge circuit are on for a duration Td; wherein:

the first secondary-side bridge circuit is controlled by asymmetrical pulse width modulation (PWM);

the first secondary-side bridge circuit comprises a first half-bridge circuit and a second half-bridge circuit connected in parallel; the first half-bridge circuit comprises a first switching transistor and a second switching transistor, and the second half-bridge circuit comprises a third switching transistor and a fourth switching transistor; and the first switching transistor and the fourth switching transistor are arranged diagonally, and the second switching transistor and the third switching transistor are arranged diagonally; and the first secondary-side bridge circuit being controlled by the asymmetrical PWM comprises:

the first switching transistor and the fourth switching transistor being turned on simultaneously on condition that the first switching transistor and the fourth switching transistor form a loop, wherein an on duration T1 of the first switching transistor is longer than an on duration T2 of the fourth switching transistor; and the second switching transistor and the third switching transistor being turned on simultaneously on the condition that the second switching transistor and the third switching transistor form a loop, wherein an on duration T1 of the third switching transistor is longer than an on duration T2 of the second switching transistor.

2. The charging system of claim 1, wherein the primary-side bridge circuit is controlled by symmetrical PWM.

3. The charging system of claim 2, wherein the primary-side bridge circuit comprises a third half-bridge circuit and a fourth half-bridge circuit connected in parallel; the third half-bridge circuit comprises a fifth switching transistor and a sixth switching transistor, and the fourth half-bridge circuit comprises a seventh switching transistor and an eighth switching transistor; and the fifth switching transistor and the eighth switching transistor are arranged diagonally, and the sixth switching transistor and the seventh switching transistor are arranged diagonally; and the primary-side bridge circuit being controlled by the symmetrical PWM comprises:

an on duration T4 of the fifth switching transistor being equal to an on duration T4 of the eighth switching transistor, on condition that the fifth switching transistor and the eighth switching transistor form a loop; and an on duration T3 of the seventh switching transistor being equal to an on duration T3 of the sixth switching transistor, on condition that the sixth switching transistor and the seventh switching transistor form a loop.

4. The charging system of claim 3, wherein in an operating period TS, the sixth switching transistor and the seventh switching transistor are turned off, once the sixth switching transistor and the seventh switching transistor are on synchronously for a duration T3; the fifth switching transistor and the eighth switching transistor are turned off, once the fifth switching transistor and the eighth switching transistor are on synchronously for a duration T4 after the sixth switching transistor and the seventh switching transistor are off for a duration T0; and a next operating period TS proceeds, once the fifth switching transistor and the eighth switching transistor are off for the duration T0.

5. The charging system of claim 1, wherein the first secondary-side bridge circuit being controlled by the asymmetric PWM further comprises:

the second switching transistor and the third switching transistor being turned off on condition that the fourth switching transistor is off for a duration T12 and the first switching transistor is on for the duration T12; and the first switching transistor and the fourth switching transistor being turned off on condition that the second switching transistor is off for the duration T12 and the third switching transistor is on for the duration T12, wherein the on duration T1, the on duration T2, and the duration T12 satisfy: T12=T1−T2.

6. The charging system of claim 5, wherein the first secondary-side bridge circuit being controlled by the asymmetric PWM further comprises:

the second switching transistor and the third switching transistor being turned on simultaneously once the first switching transistor is off for a duration TD; and proceeding to a next operating period once the third switching transistor is off for the duration TD.

7. The charging system of claim 1, wherein the on duration T2 of the second switching transistor and the on duration T2 of the fourth switching transistor are adjustable; and on condition that the on duration T2 is prolonged, a range of an output voltage of the first secondary-side bridge circuit is expanded.

8. The charging system of claim 1, wherein an on duration Td of the switching transistors of the primary-side bridge circuit has a range satisfying: 300 nanoseconds (ns)≥Td≥500 ns.

9. A charging method, applied to a charging system, wherein the charging system comprises a primary-side bridge circuit, a transformer, a first secondary-side bridge circuit, and a second secondary-side bridge circuit, the primary-side bridge circuit is connected with a primary winding of the transformer, the secondary winding of the transformer comprises a first secondary winding and a second secondary winding, the first secondary-side bridge circuit is connected with the first secondary winding, and the second secondary-side bridge circuit is connected with the second secondary winding; the first secondary-side bridge circuit comprises a first half-bridge circuit and a second half-bridge circuit connected in parallel; the first half-bridge circuit comprises a first switching transistor and a second switching transistor, and the second half-bridge circuit comprises a third switching transistor and a fourth switching transistor; the first switching transistor and the fourth switching transistor are arranged diagonally, and the second switching transistor and the third switching transistor are arranged diagonally; and the method comprises:

turning on switching transistors of the first secondary-side bridge circuit once switching transistors of the primary-side bridge circuit are on for a duration Td, on condition that power is transferred from the first secondary-side bridge circuit to the second secondary-side bridge circuit;

wherein the method further comprises:

controlling the first secondary-side bridge circuit by asymmetrical pulse width modulation (PWM); wherein controlling the first secondary-side bridge circuit by the asymmetrical PWM comprises:

turning on the first switching transistor and the fourth switching transistor simultaneously on condition that the first switching transistor and the fourth switching transistor form a loop, wherein an on duration T1 of the first switching transistor is longer than an on duration T2 of the fourth switching transistor; and turning on the second switching transistor and the third switching transistor simultaneously on the condition that the second switching transistor and the third switching transistor form a loop, wherein an on duration T1 of the third switching transistor is longer than an on duration T2 of the second switching transistor.

10. The charging method of claim 9, further comprising: controlling the primary-side bridge circuit by symmetrical PWM.

11. The charging method of claim 10, wherein the primary-side bridge circuit comprises a third half-bridge circuit and a fourth half-bridge circuit connected in parallel; the third half-bridge circuit comprises a fifth switching transistor and a sixth switching transistor, and the fourth half-bridge circuit comprises a seventh switching transistor and an eighth switching transistor; and the fifth switching transistor and the eighth switching transistor are arranged diagonally, and the sixth switching transistor and the seventh switching transistor are arranged diagonally; and controlling the primary-side bridge circuit by the symmetrical PWM comprises:

equating an on duration T4 of the fifth switching transistor with an on duration T4 of the eighth switching transistor, on condition that the fifth switching transistor and the eighth switching transistor form a loop; and equating an on duration T3 of the seventh switching transistor with an on duration T3 of the sixth switching transistor, on condition that the sixth switching transistor and the seventh switching transistor form a loop.

12. The charging method of claim 11, wherein in an operating period TS, controlling the primary-side bridge circuit by the symmetrical PWM further comprises:

turning off the sixth switching transistor and the seventh switching transistor, once the sixth switching transistor and the seventh switching transistor are on synchronously for a duration T3;

turning off the fifth switching transistor and the eighth switching transistor, once the fifth switching transistor and the eighth switching transistor are on synchronously for a duration T4 after the sixth switching transistor and the seventh switching transistor are off for a duration T0; and proceeding to a next operating period TS, once the fifth switching transistor and the eighth switching transistor are off for the duration T0.

13. The charging method of claim 9, wherein controlling the first secondary-side bridge circuit by the asymmetric PWM further comprises:

turning off the second switching transistor and the third switching transistor on condition that the fourth switching transistor is off for a duration T12 and the first switching transistor is on for the duration T12; and turning off the first switching transistor and the fourth switching transistor on condition that the second switching transistor is off for the duration T12 and the third switching transistor is on for the duration T12, wherein the on duration T1, the on duration T2, and the duration T12 satisfy: T12=T1−T2.

14. The charging method of claim 13, wherein controlling the first secondary-side bridge circuit by the asymmetric PWM further comprises:

turning on the second switching transistor and the third switching transistor simultaneously once the first switching transistor is off for a duration TD; and proceeding to a next operating period once the third switching transistor is off for the duration TD.

15. The charging method of claim 9, wherein the on duration T2 of the second switching transistor and the on duration T2 of the fourth switching transistor are adjustable; and on condition that the on duration T2 is prolonged, a range of an output voltage of the first secondary-side bridge circuit is expanded.

16. The charging method of claim 9, wherein an on duration Td of the switching transistors of the primary-side bridge circuit has a range satisfying: 300 nanoseconds (ns)≥T≥500 ns.

17. A vehicle comprising a charging system, wherein the charging system comprises a primary-side bridge circuit, a transformer, a first secondary-side bridge circuit, and a second secondary-side bridge circuit, wherein:

the primary-side bridge circuit is connected with a primary winding of the transformer, the secondary winding of the transformer comprises a first secondary winding and a second secondary winding, the first secondary-side bridge circuit is connected with the first secondary winding, and the second secondary-side bridge circuit is connected with the second secondary winding; and on condition that power is transferred from the first secondary-side bridge circuit to the second secondary-side bridge circuit, switching transistors of the first secondary-side bridge circuit are turned on once switching transistors of the primary-side bridge circuit are on for a duration Td; wherein:

the first secondary-side bridge circuit is controlled by asymmetrical pulse width modulation (PWM);

the first secondary-side bridge circuit comprises a first half-bridge circuit and a second half-bridge circuit connected in parallel; the first half-bridge circuit comprises a first switching transistor and a second switching transistor, and the second half-bridge circuit comprises a third switching transistor and a fourth switching transistor; and the first switching transistor and the fourth switching transistor are arranged diagonally, and the second switching transistor and the third switching transistor are arranged diagonally; and the first secondary-side bridge circuit being controlled by the asymmetrical PWM comprises:

the first switching transistor and the fourth switching transistor being turned on simultaneously on condition that the first switching transistor and the fourth switching transistor form a loop, wherein an on duration T1 of the first switching transistor is longer than an on duration T2 of the fourth switching transistor; and the second switching transistor and the third switching transistor being turned on simultaneously on the condition that the second switching transistor and the third switching transistor form a loop, wherein an on duration T1 of the third switching transistor is longer than an on duration T2 of the second switching transistor.

18. The vehicle of claim 17, wherein the primary-side bridge circuit is controlled by symmetrical pulse width modulation (PWM), and the first secondary side bridge circuit is controlled by asymmetrical PWM.

* * * * *